United States Patent
Azuma et al.

(10) Patent No.: US 11,247,557 B2
(45) Date of Patent: Feb. 15, 2022

(54) WORKING VEHICLE

(71) Applicant: KUBOTA CORPORATION, Osaka (JP)

(72) Inventors: Hitoshi Azuma, Sakai (JP); Tetsuo Yamaguchi, Sakai (JP); Shinji Ohara, Sakai (JP); Yoshihiko Kuroshita, Sakai (JP); Michita Kono, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 97 days.

(21) Appl. No.: 16/893,490

(22) Filed: Jun. 5, 2020

(65) Prior Publication Data
US 2020/0391589 A1 Dec. 17, 2020

(30) Foreign Application Priority Data
Jun. 11, 2019 (JP) .............................. JP2019-109104

(51) Int. Cl.
| | |
|---|---|
| *B60K 17/28* | (2006.01) |
| *B60K 17/02* | (2006.01) |
| *B60K 17/10* | (2006.01) |
| *F16D 67/04* | (2006.01) |
| *B60K 25/06* | (2006.01) |

(52) U.S. Cl.
CPC .............. *B60K 17/28* (2013.01); *B60K 17/02* (2013.01); *B60K 17/10* (2013.01); *B60K 25/06* (2013.01); *F16D 67/04* (2013.01); *B60Y 2200/221* (2013.01); *F16D 2500/10437* (2013.01)

(58) Field of Classification Search
CPC ........ B60K 17/09; B60K 17/10; B60K 17/02; B60K 25/06; B60K 17/105; F16D 67/04; F16D 2500/10437; B60Y 200/221
See application file for complete search history.

(56) References Cited

U.S. PATENT DOCUMENTS

| | | | |
|---|---|---|---|
| 4,760,902 A | 8/1988 | Bellanger | |
| 5,601,172 A | 2/1997 | Kale et al. | |
| 7,048,106 B2 | 5/2006 | Hou | |
| 9,248,737 B2* | 2/2016 | Iwaki | B60K 17/105 |
| 9,475,384 B2* | 10/2016 | Matsuura | B60K 17/105 |
| 2006/0042843 A1* | 3/2006 | Yasuda | A01D 69/002 |
| | | | 180/65.1 |
| 2015/0306954 A1* | 10/2015 | Matsuura | B60K 17/3462 |
| | | | 180/233 |

FOREIGN PATENT DOCUMENTS

| | | |
|---|---|---|
| GB | 2 442 700 A | 4/2008 |
| JP | 2007-269061 A | 10/2007 |

* cited by examiner

*Primary Examiner* — Tinh Dang
(74) *Attorney, Agent, or Firm* — Keating and Bennett, LLP (57) ABSTRACT

A working vehicle includes a PTO shaft to transmit power of a propulsion shaft, a PTO clutch including a first rotor to be rotated by the power of the propulsion shaft, a second rotor to transmit the power to the PTO shaft, a press to be moved by a pressure of operation fluid between an engaging side on which the first rotor is engaged with the second rotor and a disengaging side, and a PTO brake to brake the PTO shaft when the press is positioned on the disengaging side, a control valve to control the pressure of the operation fluid to be applied to the PTO clutch, a rate setter to set a reducing rate at which the pressure of the operation fluid is reduced, and a controller to control the control valve based on the reducing rate.

6 Claims, 8 Drawing Sheets

WORKING VEHICLE

CROSS REFERENCE TO RELATED APPLICATIONS

This application claims the benefit of priority to Japanese Patent Application No. 2019-109104 filed on Jun. 11, 2019. The entire contents of this application are hereby incorporated herein by reference.

BACKGROUND OF THE INVENTION

1. Field of the Invention

The present invention relates to a working vehicle.

2. Description of Related Art

As a technique for braking a PTO shaft in a working vehicle such as a tractor, a technique disclosed in Japanese Unexamined Patent Publication No. 2007-269061 is previously known. The working vehicle disclosed in Japanese Unexamined Patent Publication No. 2007-269061 includes a PTO brake configured to brake the revolving of a PTO shaft in synchronization with a PTO clutch, and the PTO brake has a friction plate and a braking plate.

SUMMARY OF THE INVENTION

A working vehicle includes: a PTO shaft to transmit, to a working device, power of a propulsion shaft through which power of a prime mover is transmitted; a PTO clutch including: a first rotor to be rotated by the power of the propulsion shaft; a second rotor to transmit the power to the PTO shaft; a press to be moved by a pressure of operation fluid between an engaging side on which the first rotor is engaged with the second rotor and a disengaging side on which the first rotor is disengaged from the second rotor; and a PTO brake to brake the PTO shaft when the press is positioned on the disengaging side; a control valve to control the pressure of the operation fluid to be applied to the PTO clutch; a rate setter to set, with the control valve, a reducing rate at which the pressure of the operation fluid is reduced; and a controller to control the control valve based on the reducing rate set by the rate setter.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The preferred embodiments will now be described with reference to the accompanying drawings, wherein like reference numerals designate corresponding or identical elements throughout the various drawings. The drawings are to be viewed in an orientation in which the reference numerals are viewed correctly.

First Preferred Embodiment

Figure 8:
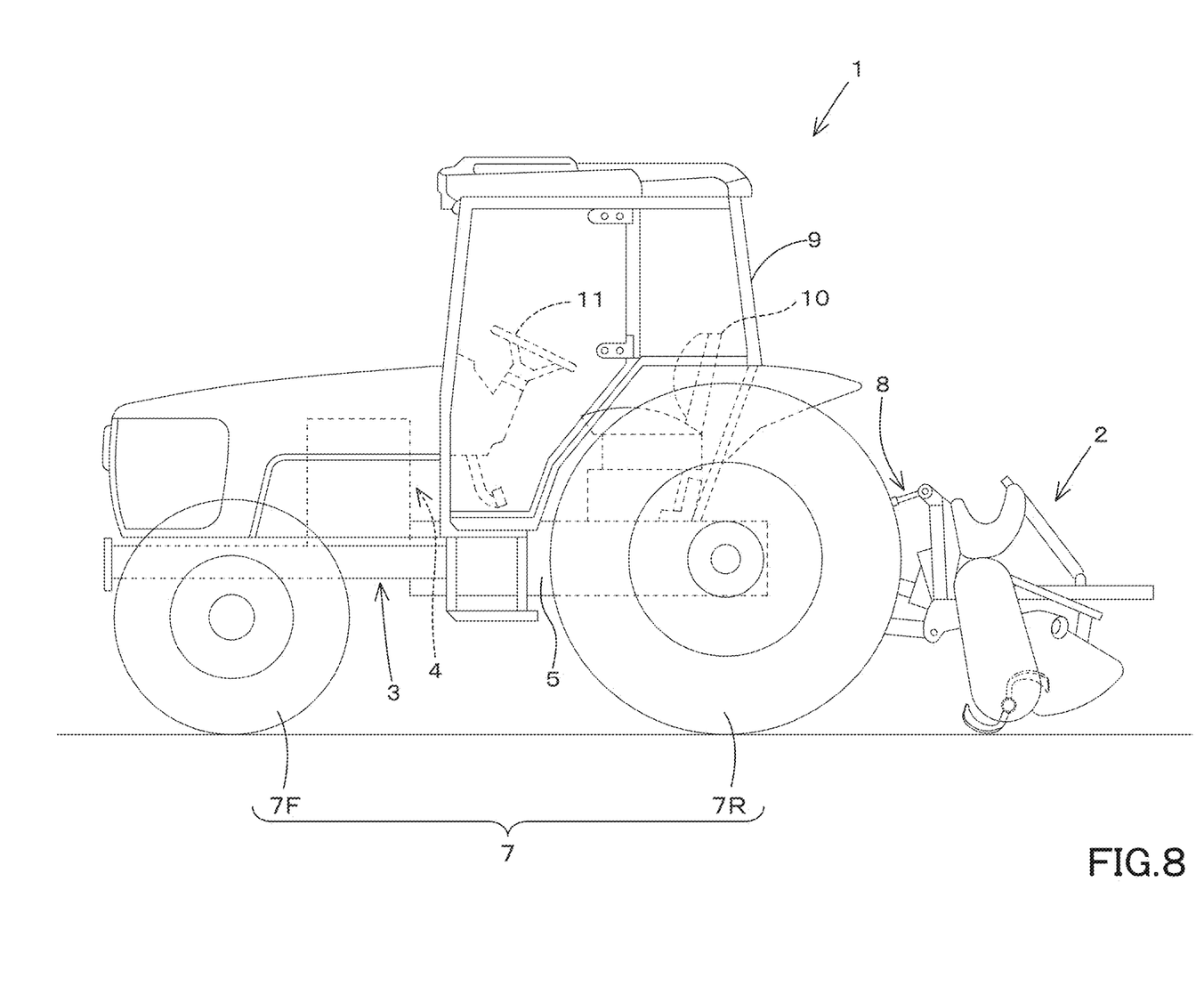
FIG. 8 is a whole view illustrating a tractor according to the preferred embodiments of the present invention.

FIG. 8 is a side view showing a working vehicle 1 according to a first preferred embodiment of the present invention. FIG. 8 is a plan view showing the working vehicle 1 according to the present preferred embodiment. In the present preferred embodiment, the working vehicle 1 is a tractor. However, the working vehicle 1 is not limited to the tractor, and may be an agricultural machine (an agricultural vehicle) such as a combine harvester or a transplanter.

Hereinafter, a front side of an operator sitting on an operator seat 10 of the tractor (the working vehicle) 1 is referred to as the front, a rear side of the operator is referred to as the rear, a left side of the operator is referred to as the left, and a right side of the operator is referred to as the right. In addition, a horizontal direction that is a direction orthogonal to the front-rear direction of the working vehicle 1 will be described as a machine width direction.

As shown in FIG. 8, the tractor 1 includes a vehicle body 3 having a traveling device 7, a prime mover 4, a transmission device 5, and a steering device 11. The traveling device 7 is a device having a front wheel 7F and a rear wheel 7R. The front wheel 7F may be a tire type or a crawler type. In addition, the rear wheel 7R may also be a tire type or a crawler type. The prime mover 4 is an internal combustion engine such as a gasoline engine or a diesel engine, an electric motor, or the like. In this preferred embodiment, the prime mover 4 is a diesel engine.

The transmission device 5 is configured to switch the propulsive force of the traveling device 7 by shifting speeds and to switch between the forward traveling and the reverse traveling of the traveling device 7. A cabin 9 is provided in the vehicle body 3, and an operator seat 10 is provided in the cabin 9.

An lifting device 8 is provided at the rear portion of the vehicle body 3. The working device 2 can be attached to and detached from the lifting device 8. In addition, the lifting device 8 is configured to lift the attached working device 2. The working device 2 is a tiller device for tilling, a fertilizer sprayer device for spraying fertilizer, a pesticide sprayer device for spraying pesticides, a harvester device for harvesting, a mower device for mowing grass and the like, a tedder device for tedding grass and the like, a raking device for raking grass and the like, a baler device for baling grass and the like, or the like. In addition, in FIG. 8, an example in which attached the tiller device is attached as the working device 2 is shown.

Figure 1:
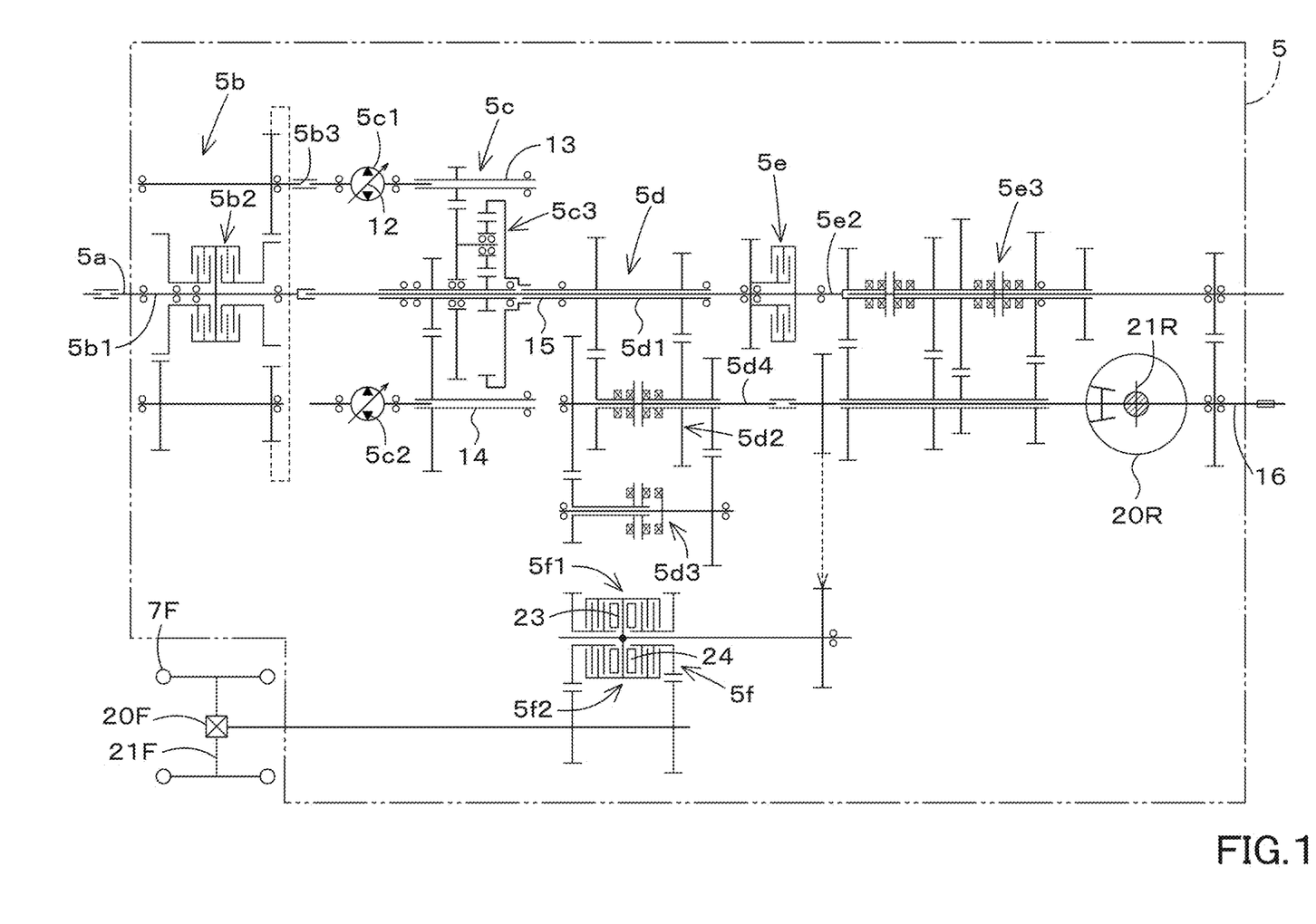
FIG. 1 is a configuration view of a transmission device according to a first preferred embodiment of the present invention.

As shown in FIG. 1, the transmission device 5 includes a main shaft (a propulsion shaft) 5a, a shuttle portion 5b, a main transmission portion 5c, a sub-transmission portion 5d, a PTO clutch device 5e, and a front transmission portion 5f. The propulsion shaft 5a is rotatably supported by a housing case of the transmission device 5, and the power from the crankshaft of the prime mover 4 is transmitted to the propulsion shaft 5a.

The shuttle portion 5b includes a shuttle shaft 5b1 and a forward/reverse switching portion 5b2. Power supplied from the propulsion shaft 5a is transmitted to the shuttle shaft 5b1. The forward/reverse switching portion 5b2 includes, for example, a hydraulic clutch or the like, and switches the revolving direction of the shuttle shaft 5b1, that is, switches between the forward traveling and the backward traveling of the tractor 1 by engaging and disengaging the hydraulic clutch.

The main transmission portion 5c is a continuously variable transmission mechanism that continuously changes the input power. The continuously variable transmission mechanism includes a hydraulic pump 5c1, a hydraulic motor 5c2, and a planetary gear mechanism 5c3. The hydraulic pump 5c1 revolves with the power supplied from the output shaft 5b3 of the shuttle portion 5b. The hydraulic pump 5c1 is, for example, a variable displacement pump including a swash plate 12, and is configured to change the flow rate of the operation fluid outputted from the hydraulic pump 5c1 by changing the angle of the swash plate 12 (a swash plate angle). The hydraulic motor 5c2 is a motor configured to be revolved by the operation fluid outputted from the hydraulic pump 5c1 through a fluid tube circuit such as piping. The revolving speed of the hydraulic motor 5c2 can be changed by changing the swash plate angle of the hydraulic pump 5c1 or changing the power to be inputted to the hydraulic pump 5c1.

The planetary gear mechanism 5c3 includes a plurality of gears and a power transmission shaft such as an input shaft and an output shaft, and includes an input shaft 13 to which the power of the hydraulic pump 5c1 is inputted and includes an input shaft 14 to which the power of the hydraulic motor 5c2 is inputted. The planetary gear mechanism 5c3 combines the power of the hydraulic pump 5c1 and the power of the hydraulic motor 5c2, and then transmits the combined power to the output shaft 15.

Thus, according to the main transmission portion 5c, the power to be outputted to the sub transmission portion 5d can be changed by changing the swash plate angle of the swash plate 12 of the hydraulic pump 5c1, the revolving speed of the prime mover 4, and the like. The main transmission portion 5c is defined by the continuously variable transmission mechanism. However, the main transmission portion 5c may be defined by a transmission mechanism with stepped gears.

The sub-transmission portion 5d is a transmission mechanism including a plurality of stepped gears that change the power, and changes and outputs the power inputted from the output shaft 15 of the planetary gear mechanism 5c3 to the sub-transmission portion 5d (changes the speed) by appropriately changing the connection (engagement) between the plurality of gears. The sub-transmission portion 5d includes an input shaft 5d1, a first transmission clutch 5d2, a second transmission clutch 5d3, and an output shaft 5d4. The input shaft 5d1 is a shaft to which the power of the output shaft 15 of the planetary gear mechanism 5c3 is inputted, and inputs the inputted power to the first transmission clutch 5d2 and the second transmission clutch 5d3 through the gears or the like. By respectively engaging or the disengaging the first transmission clutch 5d2 and the second transmission clutch 5d3, the inputted power is changed and outputted to the output shaft 5d4. The power outputted to the output shaft 5d4 is transmitted to the rear wheel differential device 20R. The rear wheel differential device 20R rotatably supports a rear axle 21R to which the rear wheel 7R is attached.

The PTO clutch device 5e includes, for example, a hydraulic clutch or the like, and is switched, by turning the hydraulic clutch on and off, between a state in which the power of the propulsion shaft 5a is transmitted to the PTO propulsion shaft 5e2 (an engaging state) and a state in which the power of the propulsion shaft 5a is not transmitted to the PTO propulsion shaft 5e2 (a disengaging state). The power of the PTO propulsion shaft 5e2 is transmitted to the PTO shaft 16 through the gears or the like.

The front transmission portion 5f includes a first front transmission clutch 5f1 and a second front transmission clutch 5f2. The first front transmission clutch 5f1 and the second front transmission clutch 5f2 are capable of transmitting the power that is supplied from the sub-transmission portion 5d, and, for example, the power of the output shaft 5d4 is transmitted through the gears and the transmission shaft. The power supplied from the first front transmission clutch 5f1 and the second front transmission clutch 5f2 can be transmitted to the front axle shaft 21F through the front power transmission shaft. In particular, the front transmission shaft is connected to the front wheel differential device 20F, and the front wheel differential device 20F rotatably supports the front axle 21F to which the front wheels 7F are attached.

Each of the first front transmission clutch 5f1 and the second front transmission clutch 5f2 is defined by a hydraulic clutch or the like. A fluid tube is connected to the first front transmission clutch 5f1, and the fluid tube is connected to a control valve 23 to which the operation fluid outputted from the hydraulic pump is supplied. The first front transmission clutch 5f1 switches between the engaging state and the disengaging state in accordance with the opening aperture of the control valve 23. A fluid tube is connected to the second front transmission clutch 5f2, and the control valve 24 is connected to the fluid tube. The second front transmission clutch 5f2 switches between the engaging state and the disengaging state in accordance with the opening aperture of the control valve 24. Each of the control valve 23 and the control valve 24 is defined by, for example, a two-position switching valve with a solenoid valve, and are switched to the engaging state or to the disengaging state by magnetizing or demagnetizing the solenoid of the solenoid valve.

When the first front transmission clutch 5f1 is in the disengaging state and the second front transmission clutch 5f2 is in the engaging state, the power of the sub-transmission portion 5d is transmitted to the front wheel 7F through the second front transmission clutch 5f2. In this manner, the four-wheel drive (4WD) to drive the front wheels and the rear wheels with the power is established, and the front wheels and the rear wheels have substantially the same revolving speed (the 4WD constant velocity state). On the other hand, when the first front transmission clutch 5f1 is in the engaging state and the second front transmission clutch 5/2 is in the disengaging state, the four-wheel drive is established, and the revolving speeds of the front wheels become faster than the revolving speeds of the rear wheels (4WD speed-increasing state). In addition, when the first front transmission clutch 5/1 and the second front transmission clutch 5/2 are in the engaging state, the power of the sub transmission portion 5d is not supplied to the front wheels 7F, and thus the four-wheel drive (2WD) to drive the rear wheels with the power is established.

Figure 2:
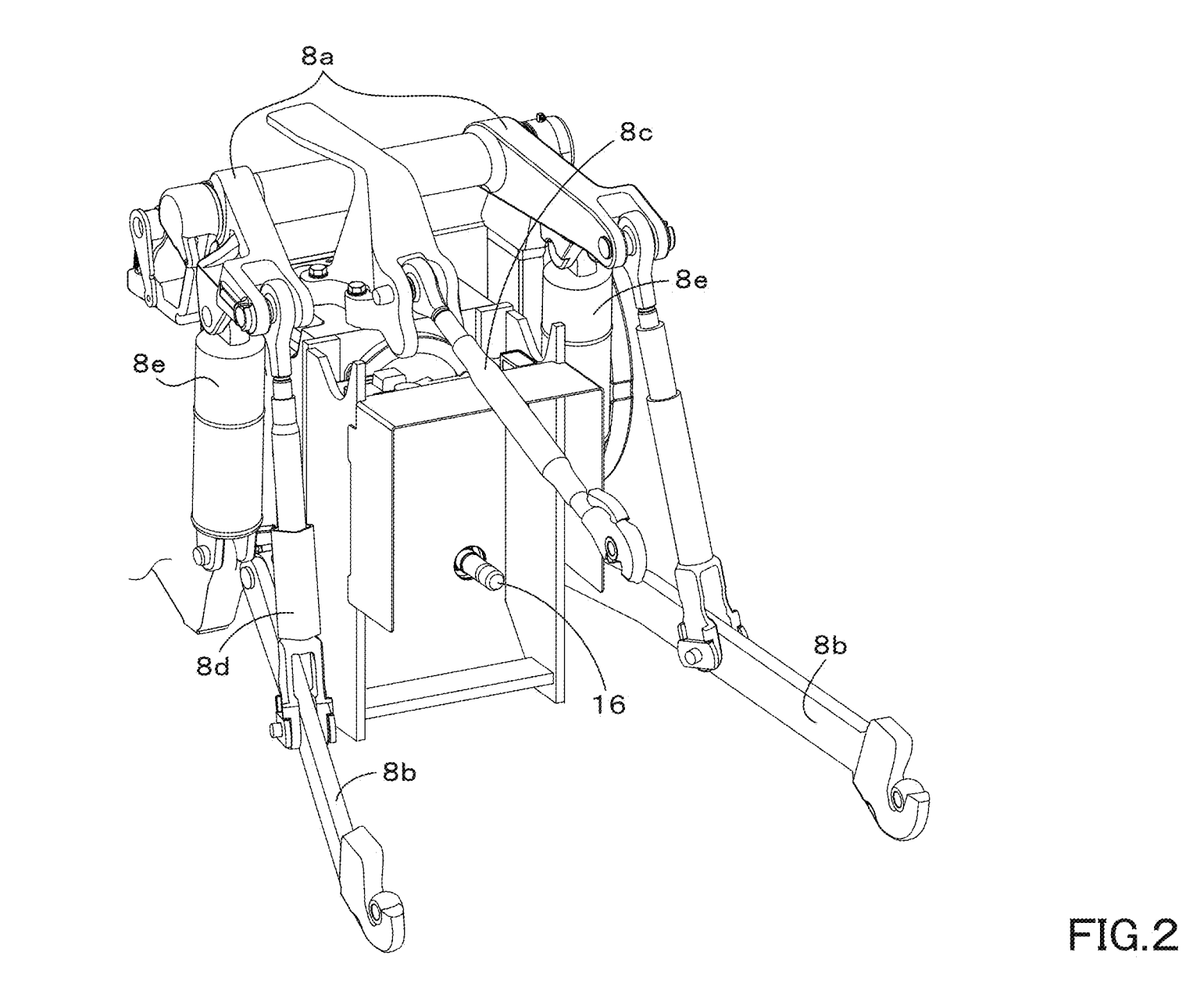
FIG. 2 is a configuration view of a lifting device according to the first preferred embodiment of the present invention.

As shown in FIG. 2, the lifting device 8 includes a lift arm 8a, a lower link 8b, a top link 8c, a lift rod 8d, and a lift cylinder 8e. A front end portion of the lift arm 8a is supported by a rear upper portion of a case (a transmission case) accommodating the transmission device 5 so as to be swingable upward or downward. The lift arm 8a is swung (moved up and down) by driving the lift cylinder 8e. The lift cylinder 8e is defined by a hydraulic cylinder. The lift cylinder 8e is connected to the hydraulic pump through the control valve 34.

The front end portion of the lower link 8b is supported on the lower rear portion of the transmission device 5 so as to be swingable upward or downward. The front end portion of the top link 8c is supported by the rear portion of the transmission device 5 so as to be swingable upward or downward above the lower link 8b. The lift rod 8d connects the lift arm 8a and the lower link 8b. The working device 2 is connected to the rear portion of the lower link 8b and to the rear portion of the top link 8c. When the lift cylinder 8e is driven (stretched and shortened), the lift arm 8a is moved up and down, and the lower link 8b connected to the lift arm 8a by the lift rod 8d is moved up and down. In this manner, the working device 2 swings upward or downward (moves up and down) with the front portion of the lower link 8b as a fulcrum.

Figure 3:
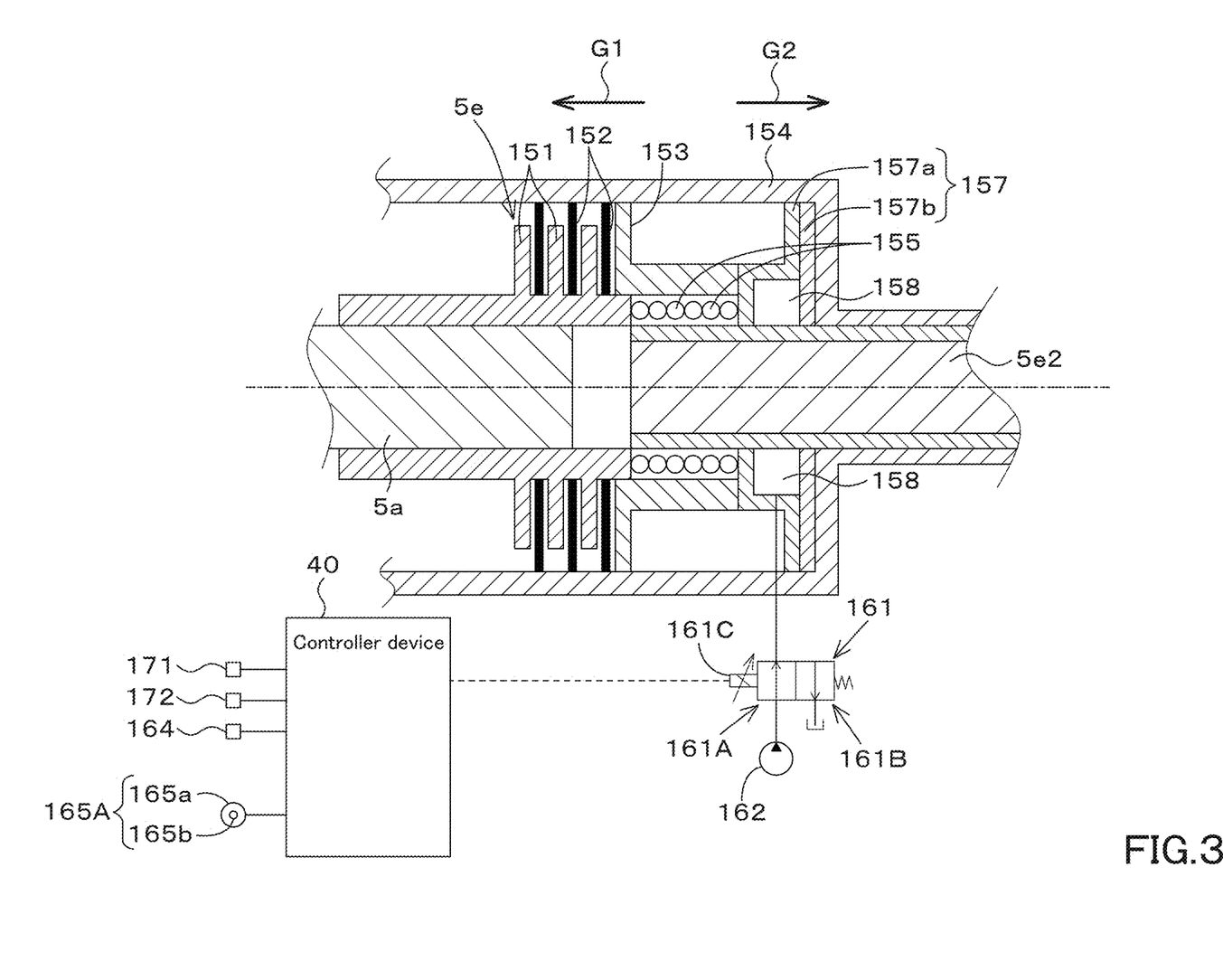
FIG. 3 is a view illustrating a PTO clutch device and a controller device according to the first preferred embodiment of the present invention.

As shown in FIG. 3, the PTO clutch device 5e includes a first rotor member 151, a second rotor member 152, and a pressing member 153. The first rotor member 151 is fixed to the propulsion shaft 5a and rotates with the revolving of the propulsion shaft 5a. The second rotor member 152 transmits the power to the PTO shaft 16, and is defined by, for example, a circular disk. The pressing member 153 is a piston configured to be moved by the pressure of the operation fluid between the engaging side on which the first rotor member 151 is pressed to the second rotor member 152 and the disengaging side on which the first rotor member 151 is disengaged from the second rotor member 152. The pressing member 153 is movably provided in the housing 154 and moves to the pressing side (the engaging side) G1 side against the biasing force of the spring 155, such that the first rotor member 151 is pressed to the second rotating member, and the pressing member 153 moves to the releasing side (the disengaging side) G2 side with the biasing force of the spring 155, such that the first rotor member 151 is separated from the second rotating member. That is, when the pressing member 153 moved to the pressing side G1, the engaging state in which the power of the propulsion shaft 5a is transmitted to the PTO propulsion shaft 5e2 is established, and when the pressing member 153 is moved to the disengaging side G2, the disengaging state in which the power of the propulsion shaft 5a is not transmitted to the PTO propulsion shaft 5e2.

The PTO clutch device 5e includes a PTO brake 157. The PTO brake 157 is configured to reduce the revolving of the PTO shaft 16 when the pressing member 153 is positioned on the disengaging side G2. The PTO brake 157 includes a first contact member 157a configured to move in accordance with the movement of the pressing member 153, and includes a second contact member 157b configured to be fixed to the housing 154 or the like. The first contact member 157a is fixed to the pressing member 153. When the pressing member 153 moves to the engaging side G1, the first contact member 157a moves in a direction separating away from the second contact member 157b, and when the pressing member 153 moves to the disengaging side G2, the first contact member 157a moves toward the second contact member 157b. The first contact member 157a and the second contact member 157b include facing surfaces that face each other. The facing surface of the first contact member 157a and the facing surface of the second contact member 157b are pressed to each other when the pressing member 153 moves to the disengaging side G2, the braking is applied. The facing surface of the first contact member 157a and the facing surface of the second contact member 157b are separated from each other when the pressing member 153 moves to the engaging side G1, the braking is released.

A supply chamber 158 to supply the operation fluid is provided in the housing 154, and the pressing member 153 is moved in the housing 154 by the pressure of the operation fluid supplied to the supply chamber 158. A fluid tube 160 is connected to the supply chamber 158, and a control valve 161 is connected to the fluid tube 160. The control valve 161 is a valve configured to control the PTO clutch device 5e, that is, to control the pressure of the operation fluid in the supply chamber 158. And, the control valve 161 is, for example, a proportional solenoid valve configured to switch between a first position 161A and a second position 162B. The operation fluid from the hydraulic pump 162 is supplied to the control valve 161. When the control valve 161 is set to the first position 161A, the operation fluid is supplied to the supply chamber 158, and thus the pressure in the supply chamber 158 is increased. When the control valve 161 is set to the second position 161B, the operation fluid in the supply chamber 158 passes through the control valve 161 and is discharged to the discharge portion such as the operation fluid tank, so that the pressure in the supply chamber 158 is reduced.

In this manner, the PTO clutch device 5e is capable of being switched between the engaging state and the disengaging state by switching the control valve 161 to either the first position 161A or the second position 161B. In particular, the revolving of the PTO shaft 16 can be stopped by the braking of the PTO brake 157 simultaneously when the PTO clutch device 5e is set to the disengaging state.

As shown in FIG. 3, the tractor 1 includes a controller device 40. The controller device 40 is configured to perform various controls of the tractor 1, and, for example, performs the lifting control, the PTO control, and the like. In the lifting control, the controller device 40 magnetizes the solenoid of the control valve 34 to switch the control valve 34 to the lifting position when a command for the lifting is issued through operation of the lifting operation tool 171. In this manner, the lift cylinder 8e is stretched, and the rear end portion of the lift arm 8a (the end portion on the working device 2 side) is lifted.

In the lifting control, when the lifting operation tool 171 is operated in a lowering direction (a lowering side), the controller device 40 magnetizes the solenoid of the control valve 34 to switch the control valve 34 to the lowering position. In this manner, the lift cylinder 8e is shortened, and the rear end portion of the lift arm 8a (the end portion on the working device 2 side) is lowered.

In addition, the controller device 40 stops the lifting operation of the lifting device 8 when the angle of the lift arm 8a reaches the position of the working device 2, that is, reaches the upper limit (the upper limit value of height) set by the upper limit setting dial 172 under the state where the working device 2 is moved upward by the lifting device 8.

In addition, a PTO switching member 164 is connected to the controller device 40. The PTO switching member 164 includes a seesaw switch, a button switch, a slide switch, or the like, and is configured to be switched on and off. In the PTO control, when the PTO switching member 164 is switched on, the controller device 40 magnetizes the solenoid 161C of the control valve 161 to switch the control valve 161 to the first position 161A. Additionally in the PTO control, when the PTO switching member 164 is switched off, the controller device 40 demagnetizes the solenoid 161C of the control valve 161 to switch the control valve 161 to the second position 161B.

Figure 4:
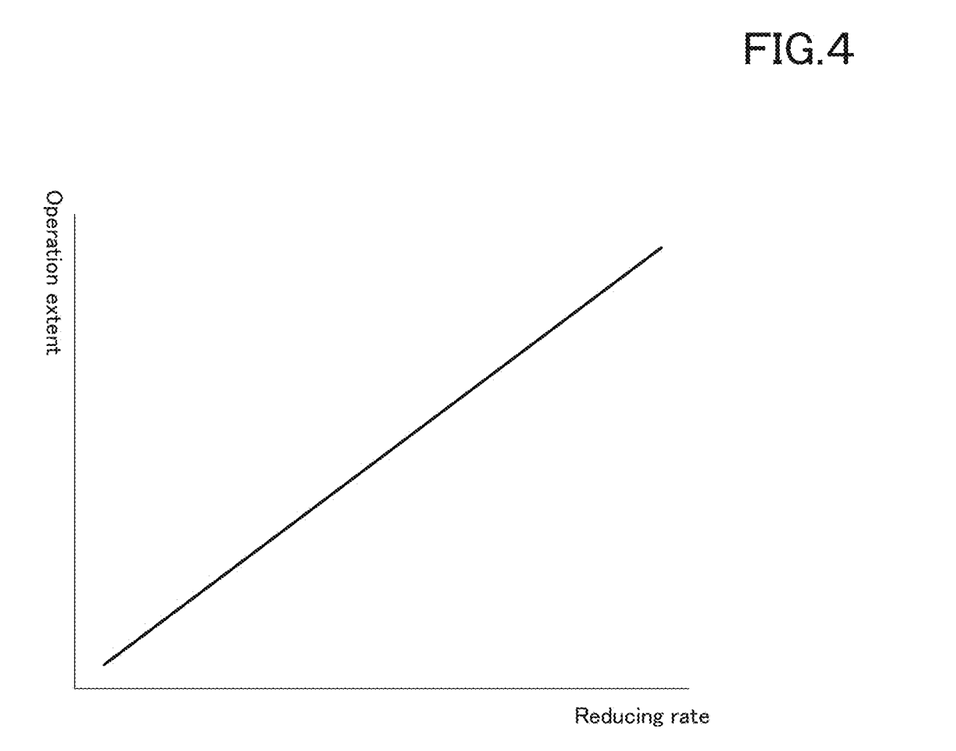
FIG. 4 is a view illustrating a relation between a reducing rate and an operation extent of a rate-setting switch according to the first preferred embodiment of the present invention.

In addition, a rate setting portion 165A is connected to the controller device 40. The rate setting portion 165A is configured to set the reducing rate of the pressure of the operation fluid when the control valve 61 is switched to the second position 161B, that is, when the operation fluid in the supply chamber 158 of the PTO clutch device 5e is discharged to the outside to reduce the pressure of the operation fluid applied to the supply chamber 158 (a working pressure). The rate setting portion 165A is, for example, a rate setting switch with which the operator manually sets the reducing speed. The rate setting switch is a hardware switch, and is a volume switch (a turn switch) including a cylindrical knob 165a capable of turning about the vertical axis 165b. As shown in FIG. 4, when the knob 165a is turned in one direction, the reducing rate to be set becomes small, and when turned in the other direction, the reducing rate to be set becomes large.

The controller device 40 controls the control valve 61 based on the reducing rate set by the rate setting portion 165A. In particular, when the reducing rate set by the rate setting portion 165A is high, the controller device 40 increases the speed (a switching speed) at which the control valve 161 is switched from the first position 161A to the second position 161B, thus increasing the reducing rate of the working pressure in the supply chamber 158. In addition, when the reducing rate set by the rate setting portion 165A is small, the controller device 40 slows the switching speed at which the control valve 161 is switched from the first position 161A to the second position 161B, so that the reducing rate of the working pressure in the supply chamber 158 is increased. As described above, the controller device 40 and the rate setting portion 165A change the reducing rate of the working pressure in the supply chamber 158 to adjust the braking force of the PTO brake 157 per unit time. According to this configuration, since the inertial force of the PTO shaft 16 differs depending on the type of the working device 2, the braking force of the PTO brake 157 that works at the same time when the PTO brake 157 is disengaged can be weakened by decreasing the reducing speed with the rate setting portion 165A in the case where the inertial force is large. And, it is possible to prevent the burn-in due to the pressured contact between the first contact member 157a and the second contact member 157b, thus extending the life of the PTO brake 157. On the other hand, when the inertial force is small, the braking force of the PTO brake 157 can be increased by increasing the reducing rate with the rate setting portion 165A, and thus the PTO shaft 16 can be stopped quickly. That is, the driver can change the reducing rate while predicting the inertial force, simultaneously confirming the type and state of the working device 2, and thus it is possible to quickly rotate the PTO shaft 16 while preventing the burn-in.

Second Preferred Embodiment

Figure 5:
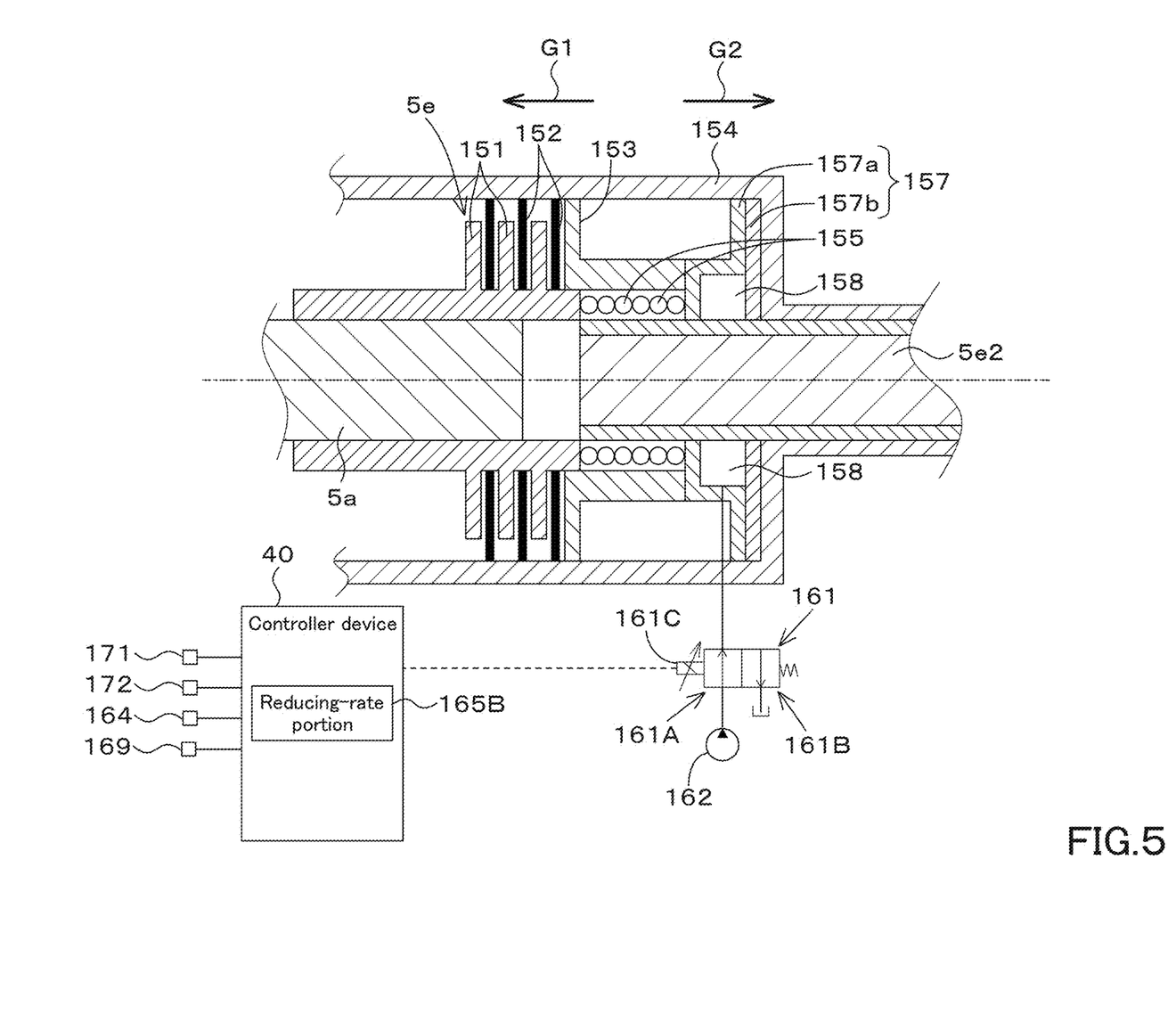
FIG. 5 is a view illustrating a PTO clutch device and a controller device according to a second preferred embodiment of the present invention.

FIG. 5 is a view showing a PTO clutch device and a controller device according to a second preferred embodiment of the present invention. In the second preferred embodiment, the description of the configurations same as those of the first preferred embodiment will be omitted.

As shown in FIG. 5, the controller device 40 includes a rate setting portion 165B. The rate setting portion 165B includes an electric/electronic circuit provided in the controller device 40, a computer program stored in the controller device 40, or the like.

The rate setting portion 165B sets the reducing rate based on the revolving speed of the PTO shaft 16 when the pressing member 153 of the PTO clutch device 5e is moved to the engaging side. In particular, the controller device 40 is connected to a revolving detector device 169 configured to detect the revolving speed of the PTO shaft 16.

Figure 6:
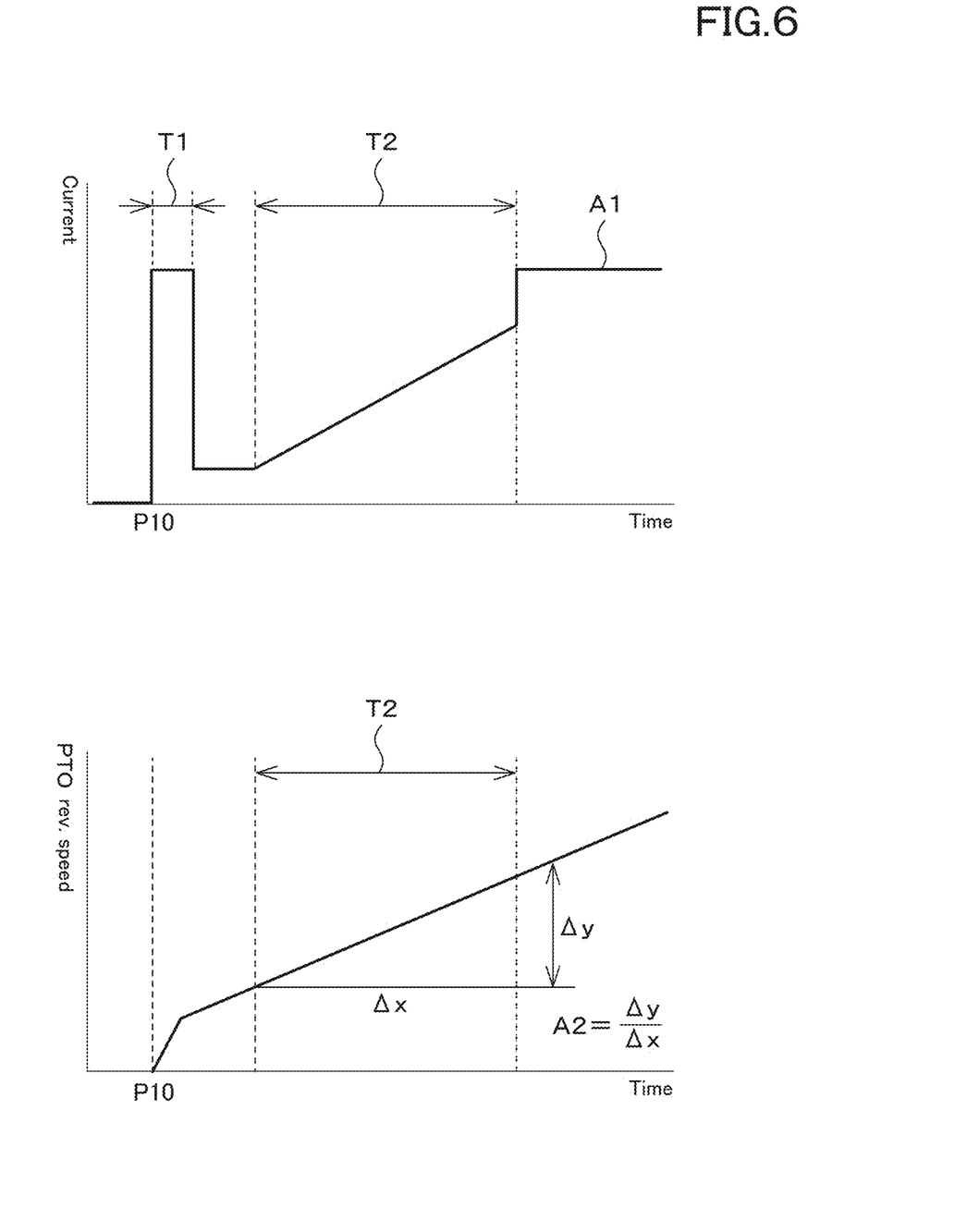
FIG. 6 is a view illustrating a relation between an increasing rate of a PTO shaft and an electric current (a control signal) outputted to a control valve according to the second preferred embodiment of the present invention.

As shown in FIG. 6, when the PTO switching member 164 is switched on at the point P10 under the state where the working device 2 and the PTO shaft 16 are connected to each other, the controller device 40 (the rate setting portion 165B) reduces the electric current value A1 after instantaneously increasing the current value A1 to be outputted to the solenoid 161C of the control valve 161 (a one-shot section T1), and then gradually increases the current value A1 (a modulation section T2). In addition, the rate setting portion 165B monitors the increasing tendency of the revolving speed of the PTO shaft 16 detected by the revolving detector device 169 in the modulation section T2 in which the current value Al is gradually increased, that is, in the modulation section T2 in which the current (the control signal) outputted to the control valve 61 is gradually increased by the controller device 40 (the rate setting portion 165B). For example, the rate setting portion 165B obtains, with the least square method or the like, the increasing rate (inclination) A2 based on the revolving speeds of the plurality of PTO shafts 16 in the modulation section T2. When the increasing rate (inclination) A2 is smaller than a predetermined reference rate (inclination) A3, the rate setting portion 165B reduces the reducing rate, and when the increasing rate (inclination) A2 is larger than the reference rate (inclination) A3, the rate setting portion 165A increases the reducing rate. That is, under the state where the working device 2 is driven by the PTO shaft 16, it can be assumed that the inertial force generated when stopping the working device 2 is large when the increasing speed A2 is small, and that the inertial force generated when stopping the working device 2 is small when the increasing speed A2 is large. As described above, the reducing rate can be easily set according to the inertial force estimated in driving the working device 2.

In addition, the setting of the reducing rate with the rate setting portion 165B may be performed in initially driving the working device 2 with the power of the PTO shaft 16, for example, when the working is started, that is, when the working device 2 is connected to the lifting device 8 and the PTO shaft 16 is connected to the working device 2. And, the setting of the reducing rate with the rate setting portion 165B may be performed in reengaging the PTO clutch device 5e after the disengaging of the PTO clutch device 5e. In addition, the rate setting portion 165B sets the reducing rate when the lifting device 8 is in the ascending position, that is, when the lifting device 65B is positioned at the lifting position, that is when the lifting instruction is issued by the lifting operation tool 171. In addition, the rate setting portion 165B may set the reducing rate when the lifting device 8 is positioned at the lowered position.

Figure 7:
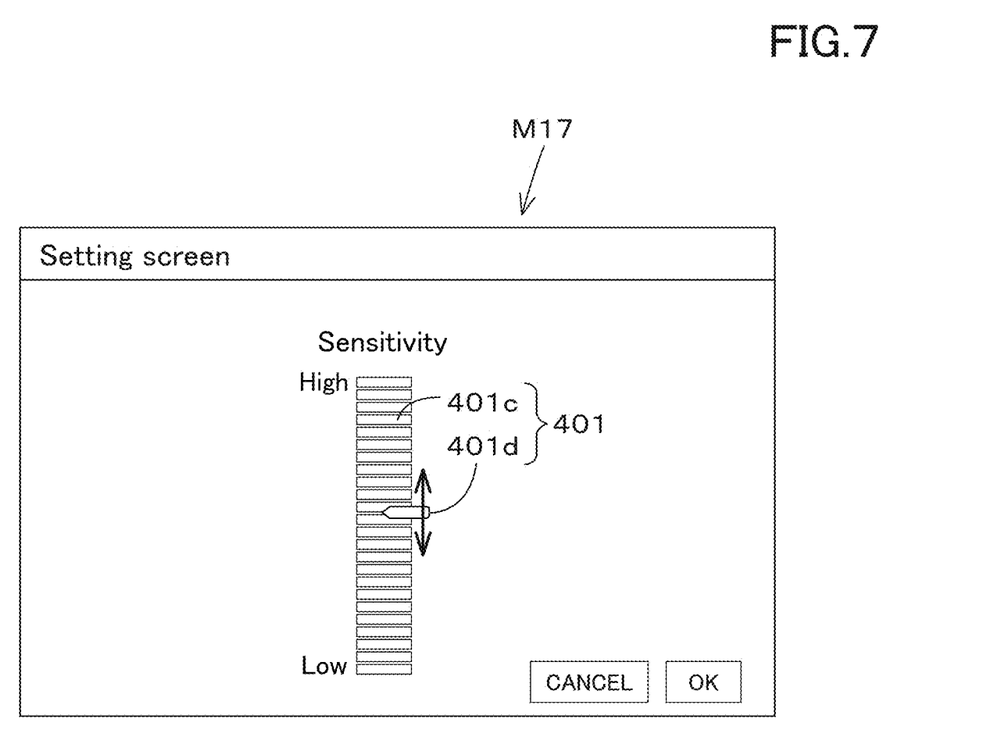
FIG. 7 is a view illustrating an example of a setting screen M17 according to the second preferred embodiment of the present invention.

The sensitivity (frequency) for setting the reducing rate with the rate setting portion 165B may be arbitrarily changed. For example, as shown in FIG. 7, when a predetermined operation is performed on the display device 45, the display device 45 displays the setting screen M17. The setting screen M17 displays a sensitivity setting tool 410. The sensitivity setting tool 410 includes a scale portion 410a and an index portion 410b. The scale portion 410a is a portion for displaying the sensitivity (the frequency), the one side has high sensitivity and the other side has low sensitivity.

The index portion 410b is movable with respect to the scale portion 410a, and is a portion for selecting the sensitivity. According to the sensitivity setting tool 410, when the sensitivity is increased, the setting frequency of the reducing rate by the rate setting portion 165B is increased in reengaging the PTO clutch device 5e after disengaging once (when re-engaging), and when the sensitivity is decreased, the setting frequency is decreased in reengaging.

The working vehicle 1 includes: the PTO shaft 16 to transmit, to the working device 2, the power of the propulsion shaft 5a through which the power of the prime mover 4 is transmitted; the PTO clutch device 5e including: the first rotor member 151 to be rotated by the power of the propulsion shaft 5a; the second rotor member 152 to transmit the power to the PTO shaft 16; the pressing member 153 to be moved by the pressure of the operation fluid between the engaging side on which the first rotor member 151 is engaged with the second rotor member 152 and the disengaging side on which the first rotor member 151 is disengaged from the second rotor member 152; and the PTO brake 157 to brake the PTO shaft 16 when the pressing member 153 is positioned on the disengaging side; the control valve (a pressure control valve) 161 to control the pressure of the operation fluid to be applied to the PTO clutch device 5e; the rate-setting portions 165A and 165B to set, with the control valve 161, a reducing rate at which the pressure of the operation fluid is reduced; and the controller device 40 to control the control valve 161 based on the reducing rate set by the rate-setting portions 165A and 165B. According to this configuration, it is possible to change the reducing rate with the rate setting portions 165A and 165B according to the working device 2 generating a large inertial force during operation and the working device 2 generating a small inertial force during operation. Thus, the braking of the PTO shaft can be appropriately performed depending on the type of the working device 2.

The rate-setting portion is the rate-setting switch 165A allowing the operator to manually set the reducing rate. According to this configuration, the reducing rate can be controlled while judging the situation where the operator operates the working device 2, for example, the magnitude of the load or the inertial force.

The working vehicle 1 includes the revolving detector device 169 to detect a revolving speed of the PTO shaft 16. The rate-setting portion 165B sets the reducing rate based on the revolving speed of the PTO shaft 16, the revolving speed being detected by the revolving detector device 169 when the pressing member 153 is moved to the engaging side. According to this configuration, the reducing rate can be set in accordance with the transition of the revolving speed of the PTO shaft 16, the transition being caused when the working device 2 is connected to the vehicle body 3 to drive the PTO shaft 16.

The rate-setting portion 165 sets the reducing rate based on a relation between the revolving speed of the PTO shaft 16 and a control signal outputted to the control valve 161, the revolving speed and the control signal being provided at a timing when the pressing member 153 is moved to the engaging side. According to this configuration, the reducing rate can be set in accordance with the transition of the revolving speed of the PTO shaft 16, the transition being caused when the control valve 161 is operated, for example, when the first rotor member 151 and the second rotor member 152 are engaged by the pressing member 153. For example, in the case where the working is performed by the working device 2, the reducing rate can be set depending on the increasing transition of the revolving speed of the PTO shaft 16, the increasing transition being caused when the working device 2 is initially driven by the PTO shaft 16.

The rate-setting portion 165B lowers the reducing rate when the increasing rate of the revolving speed of the PTO shaft 16 is smaller than the reference rate preliminarily determined and raises the reducing rate when the increasing rate is larger than the reference rate, with respect to the electric current value outputted as the control signal to the control valve 161. For example, it can be determined that the inertial force is large when the increasing rate of the revolving speed of the PTO shaft 16 is smaller than the reference speed, the increasing rate being caused when the working device 2 is initially driven by the PTO shaft 16, and determined that the inertial force is small when the increasing rate of the revolving speed of the PTO shaft 16 is larger than the reference speed. And, when the inertial force is large, it is possible to reduce or prevent wear of the PTO brake 157 or the like by reducing the reducing rate.

The rate-setting portion 165B includes the display device 45 configured to allow to set the sensitivity of the reducing rate. According to this configuration, the reducing rate can be set in accordance with various types of the working devices 2 by changing the frequency of setting the reducing rate, that is, by changing the sensitivity in automatically setting the reducing rate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
    a PTO shaft to transmit, to a working device, power of a propulsion shaft through which power of a prime mover is transmitted;
    a PTO clutch including:
        a first rotor to be rotated by the power of the propulsion shaft;
        a second rotor to transmit the power to the PTO shaft;
        a pressing member configured to be moved by a pressure of operation fluid between an engaging side on which the first rotor is engaged with the second rotor and a disengaging side on which the first rotor is disengaged from the second rotor; and
        a PTO brake to brake the PTO shaft when the pressing member is positioned on the disengaging side;
    a control valve to control the pressure of the operation fluid to be applied to the PTO clutch;
    a rate setter configured to set, with the control valve, a reducing rate at which the pressure of the operation fluid is reduced; and
    a controller to control the control valve based on the reducing rate set by the rate setter.

2. The working vehicle according to claim 1, wherein the rate setter includes a switch to allow an operator to manually set the reducing rate.

3. The working vehicle according to claim 1, further comprising:
   a revolving detector to detect a revolving speed of the PTO shaft; wherein
   the rate setter sets the reducing rate based on the revolving speed of the PTO shaft, the revolving speed being detected by the revolving detector when the pressing member is moved to the engaging side.

4. The working vehicle according to claim 3, wherein the rate setter sets the reducing rate based on a relation between the revolving speed of the PTO shaft and a control signal outputted to the control valve, the revolving speed and the control signal being provided at a timing when the pressing member is moved to the engaging side.

5. The working vehicle according to claim 4, wherein the rate setter lowers the reducing rate when an increasing rate of the revolving speed of the PTO shaft is smaller than a reference rate preliminarily determined and raises the reducing rate when the increasing rate is larger than the reference rate, with respect to an electric current value outputted as the control signal to the control valve.

6. The working vehicle according to claim 1, wherein the rate setter includes a display to allow setting of sensitivity of the reducing rate.

* * * * *